United States Patent
Planche et al.

(10) Patent No.: US 12,488,147 B2
(45) Date of Patent: Dec. 2, 2025

(54) SYSTEMS AND METHODS FOR ANONYMIZING IMAGES

(71) Applicant: Shanghai United Imaging Intelligence Co., Ltd., Shanghai (CN)

(72) Inventors: Benjamin Planche, Briarwood, NY (US); Zikui Cai, Riverside, CA (US); Zhongpai Gao, Rowley, MA (US); Ziyan Wu, Lexington, MA (US); Meng Zheng, Cambridge, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 411 days.

(21) Appl. No.: 18/103,249

(22) Filed: Jan. 30, 2023

(65) Prior Publication Data

US 2024/0256707 A1    Aug. 1, 2024

(51) Int. Cl.
*G06F 21/62* (2013.01)
*G06V 10/77* (2022.01)

(52) U.S. Cl.
CPC ...... *G06F 21/6254* (2013.01); *G06V 10/7715* (2022.01)

(58) Field of Classification Search
None
See application file for complete search history.

(56) References Cited

U.S. PATENT DOCUMENTS

| | | | | |
|---|---|---|---|---|
| 2019/0378607 | A1* | 12/2019 | Chen | G06F 21/6254 |
| 2021/0312595 | A1* | 10/2021 | Simhadri | G16H 50/70 |
| 2022/0012362 | A1* | 1/2022 | Kuta | G06V 10/758 |
| 2022/0126864 | A1* | 4/2022 | Moustafa | B60W 50/14 |
| 2022/0172517 | A1* | 6/2022 | Kuta | G06V 10/82 |
| 2023/0377195 | A1* | 11/2023 | Stember | G06T 7/0012 |
| 2024/0266074 | A1* | 8/2024 | Smurro | G16H 80/00 |

FOREIGN PATENT DOCUMENTS

| | | |
|---|---|---|
| CN | 111242837 A | 6/2020 |
| CN | 113642409 A | 11/2021 |
| CN | 114550249 A | 5/2022 |
| CN | 115021933 A | 9/2022 |

OTHER PUBLICATIONS

Kim et al., "Latent-Space-Level Image Anonymization With Adversarial Protector Networks," IEEE Access vol. 7, pp. 84992-84999, Jun. 24, 2019. DOI: 10.1109/Access.2019.2924479 (Year: 2019).*

* cited by examiner

*Primary Examiner* — Soo Shin
(74) *Attorney, Agent, or Firm* — Zhong Law, LLC

(57) ABSTRACT

A person's privacy is protected by the law in many settings and disclosed herein are systems, methods, and instrumentalities associated with anonymizing an image of a person while still preserving the visual saliency and/or utility of the image for one or more downstream tasks. These objectives may be accomplished using various machine-learning (ML) techniques such as ML models trained for extracting identifying and residual features from the input image as well as ML models trained for transforming the identifying features into identity-concealing features and for preserving the utility features of the image. An output image may be generated based on the various ML models, wherein the identity of the person may be substantially disguised in the output image while the background and utility attributes of the original image may be substantially maintained in the output image.

17 Claims, 7 Drawing Sheets

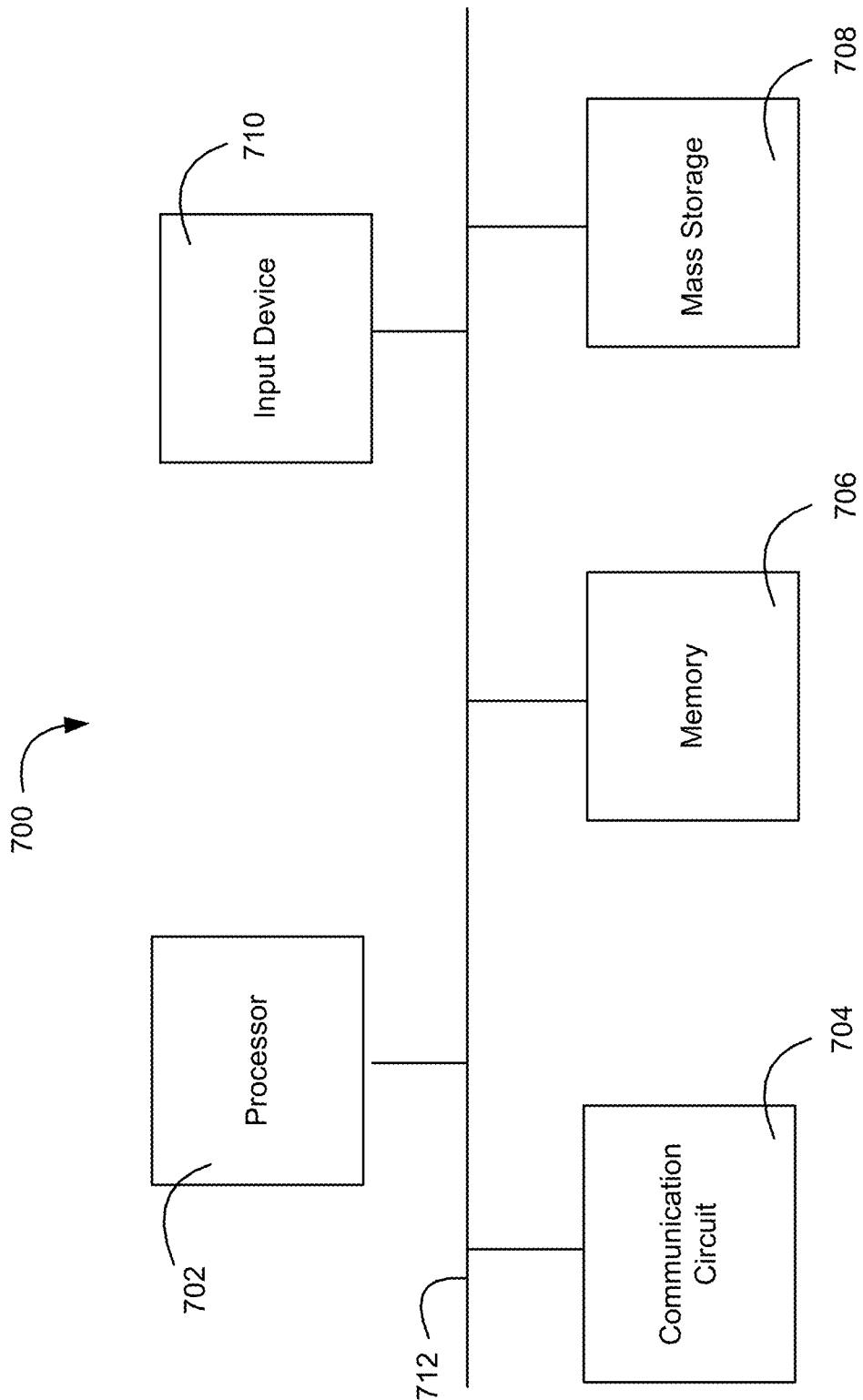

SYSTEMS AND METHODS FOR ANONYMIZING IMAGES

BACKGROUND

Personal information is protected by law in most countries of the world. The protection is especially strong in healthcare settings, where the collection, storage, and distribution of patient imagery data (e.g., images of a patient undergoing medical procedures) are subject to strict restrictions aimed at safeguarding the patients' privacy. Such imagery data, however, may be valuable to healthcare providers. For example, as artificial intelligence (AI) and machine learning (ML) are increasingly used for diagnostic and treatment purposes, patient medical images may provide the key to unlock the full potential of these technologies (e.g., with respect to training an AI model, automating a medical procedure, etc.). Accordingly, systems and methods for preserving the utility of these medical images without revealing the identity of the patients involved are highly desirable.

SUMMARY

Described herein are systems, methods, and instrumentalities associated with anonymizing personal images. According to one or more embodiments of the present disclosure, an apparatus configured to perform the image anonymization tasks may include a processor configured to obtain an input image of the person, extract a set of identifying features from the input image based on a first machine-learned (ML) model, and extract a set of residual features from the input image based on a second ML model. The set of identifying features may indicate, at least partially, an identity of the person, while a first subset of the residual features may be associated with a background of the input image and a second subset of the residual features may be associated with a utility attribute of the input image for one or more tasks. The processor may be further configured to transform the set of identifying features into a set of identity-concealing features and generate an output image of the person based on the set of identity-concealing features and the set of residual features, where the identity of the person may be substantially disguised in the output image while the background and the utility attribute of the input image may be substantially maintained in the output image.

In some embodiments, the transformation of the set of identifying features into the set of identity-concealing features may be performed in an irreversible manner. This may be accomplished, for example, based on a third ML model and/or by performing one or more random (e.g., stochastic) operations on (e.g., adding noise to) the identity-concealing features. In examples, the third ML model may be implemented through an artificial neural network that may comprise an encoder and a decoder. The encoder may be trained for predicting a latent space representation of the set of identifying features, while the decoder may be trained for generating the set of identity-concealing features based on the latent space representation and by distancing the set of identity-concealing features from the set of identifying features.

In some embodiments, at least one of the first ML model, the second ML model, or the third ML model described herein may be learned through a training process that may comprise generating a preliminary output image based on an input training image, extracting a first plurality of utility features from the preliminary output image and a second plurality of utility features from the input training image based on a pre-trained ML utility model, and adjusting the parameters of the at least one of the first ML model, the second ML model, or the third ML model to reduce a difference between the first plurality of utility features and the second plurality of utility features. In examples, the first ML model may be used during the training process to extract identifying features from the input training image, the second ML model may be used during the training process to extract respective residual features from the input training image and the preliminary output image, and the third ML model may be used during the training process to generate corresponding identity-concealing features based on the identifying features extracted from the input training image. The respective parameters of the first ML model and the third ML model may then be adjusted to maximize a difference between the identifying features extracted by the first ML model and the identity-concealing features generated by the third ML model, while the parameters of the second ML model may be adjusted to minimize a difference between the respective residual features extracted by the second ML model from the input training image and the preliminary output image.

In some embodiments, the first ML model may be derived through ensemble learning and the output image of the person may be generated by combining the set of identity-concealing features and the set of residual features and decoding the combined features to obtain the output image. In some embodiments, the utility attribute of the input image described herein may be associated with at least one of a gaze of the person as depicted in the input image, a facial expression of the person as depicted in the input image, or a facial landmark of the person as depicted in the input image.

BRIEF DESCRIPTION OF THE DRAWINGS

A more detailed understanding of the examples disclosed herein may be obtained from the following description, given by way of example in conjunction with the accompanying drawing.

FIG. 7 is a simplified block diagram illustrating example components of an apparatus that may be configured to perform the image anonymization tasks described herein.

DETAILED DESCRIPTION

The present disclosure is illustrated by way of example, and not by way of limitation, in the figures of the accompanying drawings. A detailed description of illustrative embodiments will now be described with reference to the figures. Although this description provides detailed examples of possible implementations, it should be noted that the details are intended to be exemplary and in no way limit the scope of the application. It should also be noted that while the examples may be described in the context of medical imaging, those skilled in the art will appreciate that the disclosed techniques may also be applied to other use cases involving the anonymization of a person's identity in an image while still preserving the utility of the image.

Figure 1:
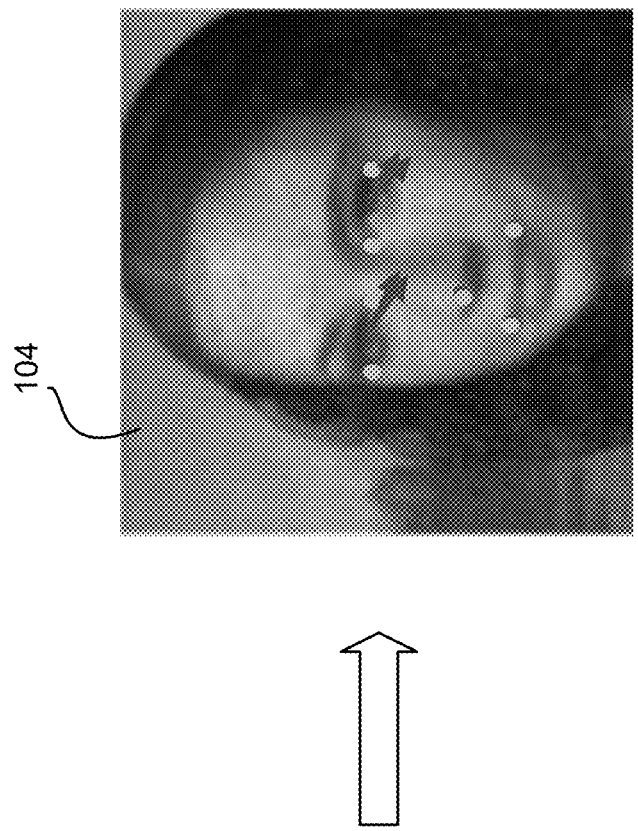
FIG. 1 is a simplified diagram illustrating an example of anonymizing an input image of a person while still preserving the utility of the input image for one or more downstream tasks in accordance with one or more embodiments of the present disclosure.
Figure 1:
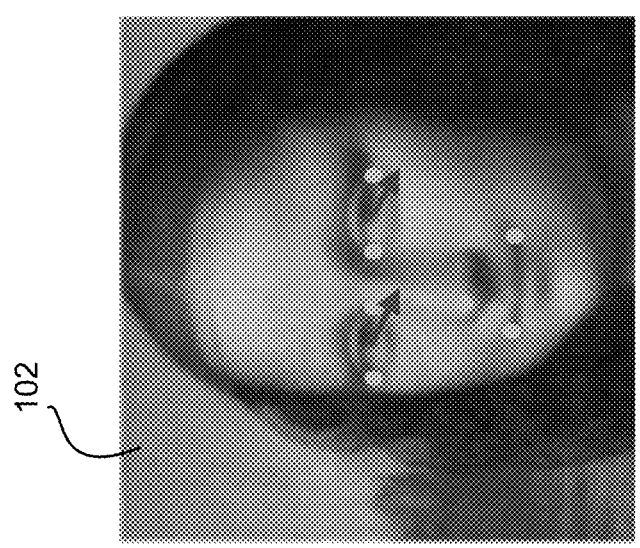

FIG. 1 illustrates an example of processing an input image of a person in accordance with one or more embodiments of the present disclosure. As shown, the input image (e.g., 102 in the figure) may include features such as an eye size, eye spacing, a nose length, a nose width, a mouth curvature, a mouth width, etc. that may collectively identify the person. The input image may also include residual features (e.g., non-identity-revealing feature such as those related to the background of the image), at least a subset of which may form a utility attribute of the image for another task. For example, such a utility attribute may be the eye gaze of the person (e.g., as indicated by the arrows in FIG. 1), which may be used by another application for determining a direction and/or an angle of the person's viewpoint. To maintain such a utility attribute of the input image for the other task without revealing the identity of the person, embodiments of the present disclosure contemplate that an output image 104 may be generated based on input image 102 and the identifying features included in the input image may be manipulated (e.g., obfuscated) to disguise or conceal the identity of the person while the residual features (e.g., the eye gaze of the person) may be preserved (e.g., substantially) to maintain the utility and/or realistic appearance of the output image. As will be described in greater details below, these objectives may be accomplished using machine-learning (ML) techniques and by detecting and adjusting certain landmarks (e.g., as indicated by the dotted areas in FIG. 1) in the input image. Compared to conventional methods for image de-identification that may rely heavily on occlusion, blurring, pixelation, and/or warping without maintaining the utility of the resulting image, the techniques described here may maintain the saliency and/or utility of the resulting image while irreversibly obscuring the identity of the person in the image to ensure privacy and confidentiality (e.g., an attacker may not be able to reverse the de-identification operations described herein to recover the identity of the person).

Figure 2:
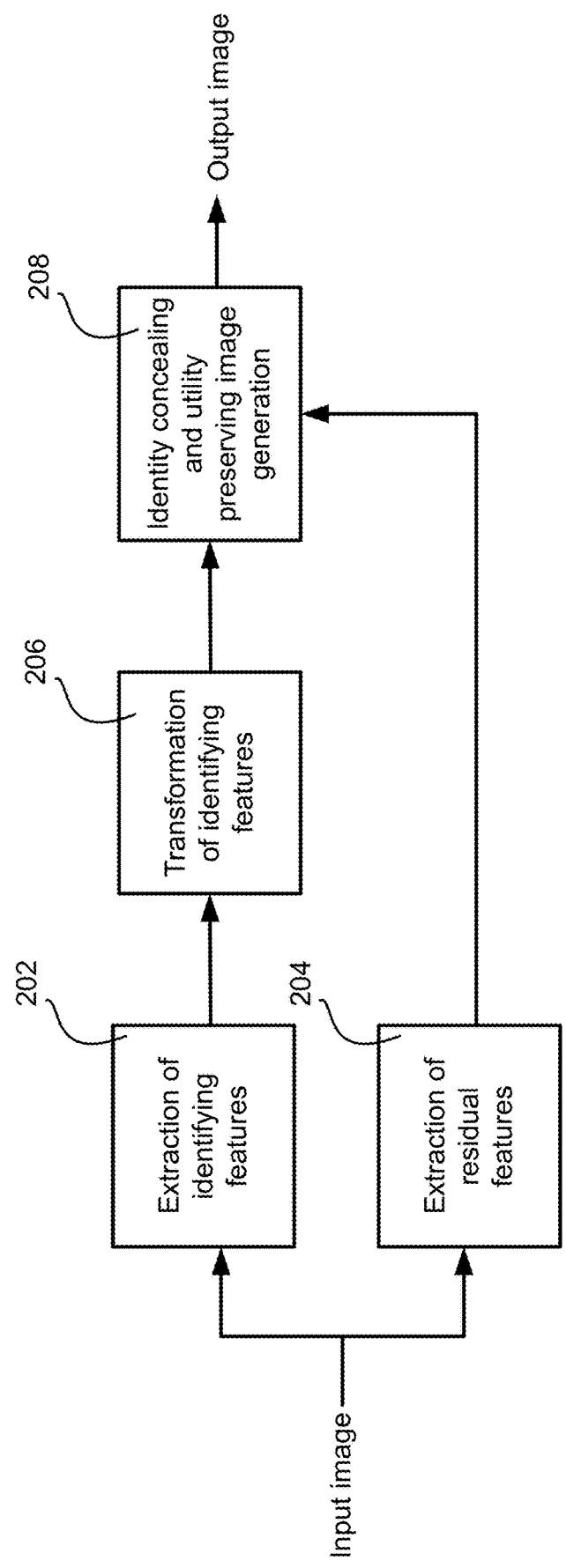
FIG. 2 is another simplified diagram illustrating an example of anonymizing an input image of a person in accordance with one or more embodiments of the present disclosure.

FIG. 2 illustrates an example of processing an input image (e.g., input image 102 of FIG. 1) of a person so as to conceal the identity of the person in an output image (e.g., output image 104 of FIG. 1) while preserving the utility of the output image for one or more downstream tasks. As shown, the processing may include extracting a set of identifying features of the person from the input image at 202 and a set of residual features from the input image at 204. The identifying features (e.g., related to the eye size, eye spacing, nose length, nose width, mouth curvature and/or mouth width of the person) may indicate, at least partially, an identity of the person, while the residual features may include a first subset of features that may be associated with a background of the input image and a second subset of features that may be associated with a utility attribute (e.g., such as an eye gaze, a facial expression, a facial landmark, etc.) of the input image for the one or more downstream tasks (e.g., gaze estimation, head-pose prediction, facial-landmarks regression, expression estimation, etc.). The processing may further include transforming (e.g., in an irreversible manner) the set of identifying features into a set of identity-concealing features at 206, and generating the output image at 208 based at least on the set of identity-concealing features and the set of residual features. The set of identity-concealing features may serve the purpose of disguising the identity of the person in the output image, while the set of residual features may operate to maintain (e.g., substantially) the background and/or the utility attribute(s) of the input image in the output image.

One or more of the operations illustrated by FIG. 2 may be performing based on a pre-trained machine-learning (ML) model. When referred to herein, the term "machine-learning" may be used interchangeably with the term "deep learning," "machine-learned," or "artificial intelligence (AI)." The ML model may be implemented and/or trained using an artificial neural network (ANN) such as a convolutional neural network (CNN), and the parameters of the ML model may correspond to the weights associated with various layers, neurons, kernels, and/or filters of the ANN.

Figure 3:
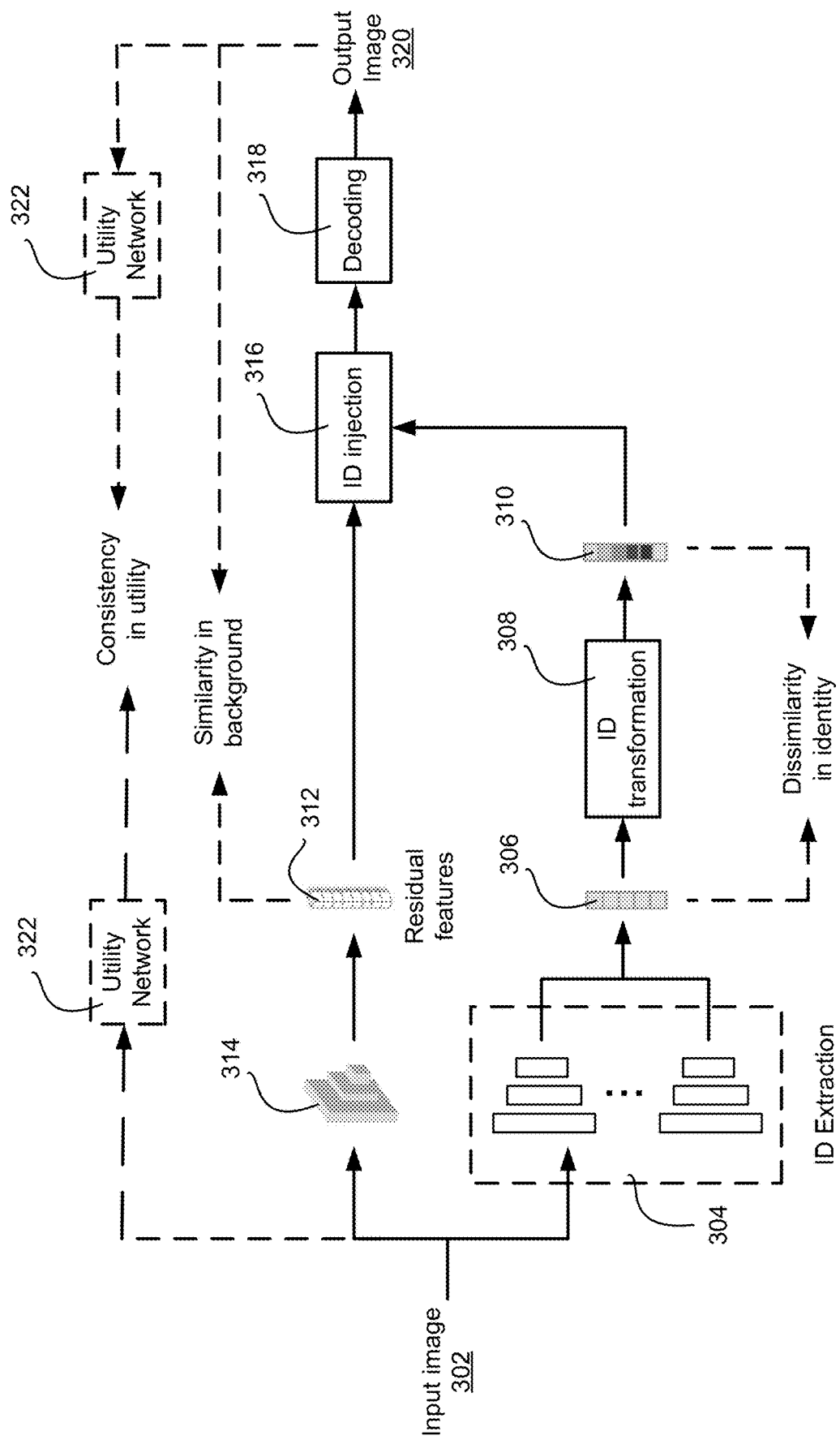
FIG. 3 is another simplified diagram illustrating example techniques for anonymizing an input image of a person in accordance with one or more embodiments of the present disclosure.

FIG. 3 illustrates example techniques for anonymizing an input image 302 of a person in accordance with one or more embodiments of the present disclosure. As shown, the anonymization techniques may include extracting, based on an ML model 304, a set of identifying features that may indicate, at least partially, the identity of the person depicted in input image 302. ML model 304 may be implemented and/or learned using one or more artificial neural networks such as one or more CNNs or one or more multi-layer perceptron (MLP) neural networks. In examples where the first ML model is implemented via a CNN, such a CNN may include an input layer and one or more convolutional layers, pooling layers, and/or fully-connected layers. The input layer may be configured to receive the input image while each of the convolutional layers may include a plurality of convolution kernels or filters with respective weights for extracting the identifying features from the input image. The convolutional layers may be followed by batch normalization and/or linear or non-linear activation (e.g., such as a rectified linear unit (ReLU) activation function), and the features extracted through the convolution operations may be down-sampled through one or more pooling layers to obtain a representation of the features, for example, in the form of an identity (ID) feature vector. In examples wherein the first ML model is implemented using an MLP network, such an MLP network may include multiple layers such as an input layer, an output layer, and one or more hidden layers (e.g., one or more fully-connected layers) with linear or non-linear activation functions. The layers of the MLP network may be associated with respective weights that may be trained to extract ID features from the input image in a forward direction, while the training of the network may be conducted via backpropagation.

In examples, an ensemble learning (e.g., model ensemble) technique may be employed to derive ML model 304 based on multiple base models (e.g., ML model 304 may be an ensemble of the multiple base models) so as to ensure the generalizability of the ML model, to limit the impact of the base models' bias (if any), to disentangle the identifying features from non-identifying features, etc. For example, a set of base facial feature recognition models (e.g., a set of ID extractors employing different algorithms, different training regimens, and/or the like) may be trained and used to predict respective ID feature vectors from input image 302 and the ID feature vectors may be combined (e.g., via averaging, max-voting, blending, etc.) into a vector 306 to represent the identifying features of the input image.

The merged ID vector 306 may then be transformed at 308 to derive a set of identity-concealing features, for example, in the form of an ID-concealing feature vector 310. The transformation may be performed in an irreversible manner such that the identifying features represented by merged ID vector 306 may be irreversibly corrupted to prevent an attacker from recovering the original identifying features of input image 302. In examples, the invertibility of the transformation process may be accomplished using a parametric function, which may be realized via a trained ML model or neural network (e.g., an MLP network with parameters $\theta_\psi$), e.g., as represented by the following: $\psi_{mlp}(z) = MLP_{\theta_\psi}(z)$. To further increase the robustness and/or to ensure E-differential privacy of the transformation function, one or more random operations may be applied (e.g., by adding random or stochastic noise) to the inner operation of the transformation function, and/or a variational encoder-decoder (VED) neural network (e.g., a VED ML model) may be employed to achieve the transformation. The encoder of such a neural network may be trained to predict the parameters of a latent space distribution (e.g., a Gaussian distribution) associated with the merged ID 306 and derive a latent vector (e.g., by mapping merged ID 306 to the latent space) based on the predicted parameters. The decoder of the VED network, on the other hand, may be trained to sample from the latent space (e.g., in the vicinity of merged ID 306) to obtain an ID-concealing feature vector 310 and derive a set of features (e.g., based on feature vector 310) that may be new and/or distant (e.g., dissimilar) from the identifying features of input image 302 (e.g., instead of reconstructing the identifying features based on merged ID vector 306, as may be the case with a variational autoencoder). A dissimilarity such as a cosine dissimilarity may be enforced between merged ID 306 and ID-concealing vector 310 during the training of the VED network or model. For example, during the training of the VED model, an output image may be generated based on ID-concealing feature vector 310 (e.g., in combination with a plurality of residual features as described belove). A set of identifying features may then be extracted from the output image (e.g., based on ML model 304) and compared to the original set of identifying feature 306 to drive the training of the VED model (e.g., parameters of the VED model may be adjusted to maximize the difference between the identifying features of the output image and those of the input image).

Still referring to FIG. 3, a set of residual features 312 may be extracted at 314 from the input image, e.g., based on an ML model. These residual features may include features that are unrelated to or only play a minor role in identifying the person depicted in the input image. For example, these residual features may include a first subset of features associated with a background of the input image and a second subset of features associated with a utility attribute (e.g., the eye gaze of the person) of the input image for one or more downstream tasks. The first and second subsets of features may overlap (e.g., a background feature may also be a utility feature) and may be represented with respective feature vectors or feature maps. Once extracted, residual features 312 may be combined (e.g., aggregated) with ID-concealing feature vector 310 at 316 and the combined features may be decoded at 318 to derive an output image 320 that may preserve the residual (including utility) features 312 of the original input image 302 while irreversibly obscuring the identity of the person depicted in the original input image 302.

One or more of the ML models described herein may be implemented with and/or learned through an artificial neural network such as a CNN or an MLP as described herein. In examples, the artificial neural network may be implemented (e.g., at least partially) as a generative-adversarial network (GAN) that may include a generator network and a discriminator network. The generator network may be trained to predict a certain result while the discriminator network may be trained to classify the predicted result as real or fake. The two networks may be trained together in a zero-sum game (e.g., based on an adversarial loss), for example, until the discriminator network is fooled about half the time by the prediction made by the generator network, which may indicate that the generator network has acquired the ability to make plausible predictions.

The ML models described herein may be trained with one or more losses designed to achieve the objectives of privacy protection, utility maintenance, quality preservation, etc. For example, in addition to or in lieu of the losses already described such as the loss between merged ID vector 306 and ID-concealing feature vector 310, a loss, $L_{mix}$, may be used to ensure disentanglement of the identifying features and residual features of the input image, while a loss, $L_{gen}$, may be used to ensure that output image 320 maintain a satisfactory level of visual saliency (e.g., by enforcing similarity between the respective backgrounds of input image 302 and output image 320). Additionally, or alternatively, a loss, $L_{id}$, may be used to enforce a similarity (e.g., a cosine similarity) between the injected identity and an identity observed using ML model 304 in output image 320. One or more of these objectives may be accomplished by pitting the generator network described herein against the discriminator network described herein, and the losses may be backpropagated individually or as a combined loss, for example, by taking an average of the individual losses.

The training of one or more of the ML models described herein may be conducted with a criterion for maintaining the utility of output image 320 with respect to one or more downstream tasks (e.g., tasks that may rely on an attention region such as an eye gaze). Such a criterion may be applied via a utility neural network 322 that may be pre-trained for extracting utility-related features from an image and/or weighing the importance of the extracted features based on their respective contributions to the utility of the image. For instance, during the training of the one or more ML models described herein, pre-trained utility neural network 322 may be used to extract respective utility features from an input training image and a preliminary output image generated based on the input training image (e.g., using the ML models described herein), and the parameters of the ML models may be adjusted with an objective (e.g., in addition to the other objectives described herein) to reduce or minimize the difference between the utility features of input image 302 and those of input image 320. The utility neural network may be implemented using various neural network architectures such as a CNN or an MLP as described herein, while the training of the utility neural network may be conducted in a task-specific manner aimed at identifying features that may be particularly useful for the task(s) at hand. Similar to ML model 304, utility model 322 may be derived in some embodiments of the present disclosure based on multiple base utility models via ensemble learning, during which utility features extracted by the base models (e.g., in accordance with different algorithms, different training regimens, and/or the like) may be combined to obtain a representation of the utility features of input image 302 or output image 320.

It should be noted here that the ML models described with respect to FIG. 3 may be end-to-end differentiable and, as such, may be trained together. The ML models may also be trained separately (e.g., by leveraging the modularity of the ML models) before being fine-tuned together in an end-to-end manner. Further, the strengths of the ML models and/or the various losses described herein may be balanced against each other during the training in accordance with the task(s) at hand. For example, the amount of noise applied during the transformation process may be controlled to balance between the non-invertibility of the transformation and the objective of distancing the original identifying features (e.g., 306 of FIG. 3) from the ID-concealing features (e.g., 310 of FIG. 3). As another example, with some downstream tasks, the utility features of input image 302 may overlap with the identifying features of the input image (e.g., the downstream tasks may rely on facial features that may also identify the person in the input image. Thus, in these examples, the objective of maximizing the utility of the anonymized image may be relaxed to ensure that the identity of the person is disguised.

Figure 4:
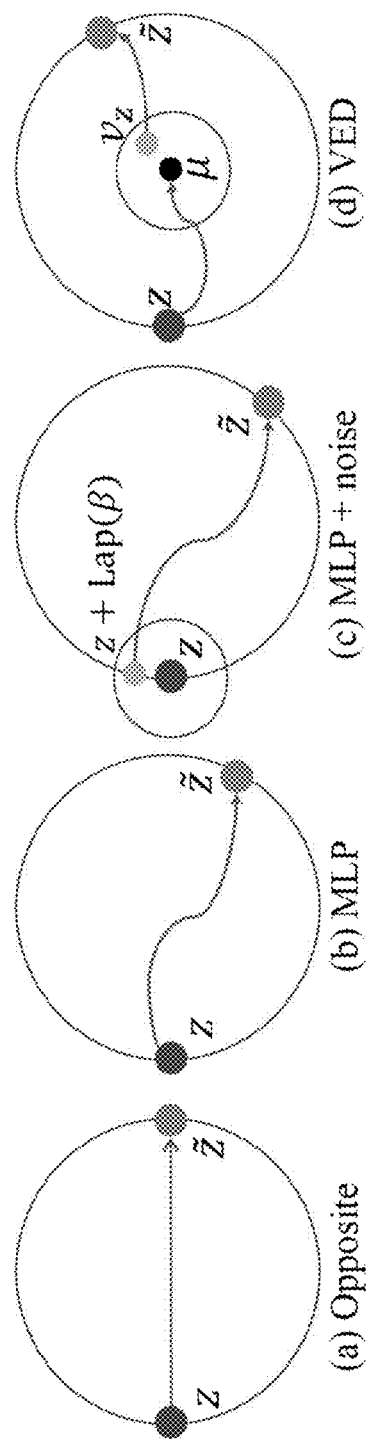
FIG. 4 includes diagrams that illustrate example techniques for transforming the identifying features of an image to conceal the identity of a person depicted in the image in accordance with one or more embodiments of the present disclosure.

FIG. 4 illustrates example techniques for transforming identifying features of an image to conceal the identity of a person depicted in the image. With the transformation technique illustrated in (a), the distance (e.g., an Euclidean distance) between the original identifying features (e.g., represented by original identity space z) and the transformed identifying features (e.g., represented by transformed identity space $\tilde{z}$) may be maximized, but the transformation may not guarantee privacy since, for example, the transformation may be invertible and therefore an attacker may be able to recover the original identifying features. The technique illustrated in (b) may offer a more secure solution by utilizing a parametric function that may be learned through the training of a neural network such as an MLP neural network. To further increase the robustness of the transformation function and/or to ensure ε-differential privacy (e.g., e may be a metric for privacy loss), noise (e.g., random or stochastic noise) may be added during the inner operation of the neural network, as illustrated in (c), wherein Lap (β) may represent a Laplace sampling technique and β may represent the level of noise applied during the transformation or obfuscation of the original image features. In examples, the level of noise (e.g., represented by β) may be inversely proportional to e (e.g., larger β may indicate more noise being added and higher privacy being ensured). For instance, β may be set as $\beta=\Delta\psi/\epsilon$, where $\Delta\psi$ may be a (e.g., objective or empirical) measure of the sensitivity of the identity-concealing ML model or neural network. The ML model or neural network may adopt a variational encoder-decoder (VED) architecture (e.g., as described herein and illustrated again in (d)), through which a balance may be achieved between the privacy guarantee and the learnability of the transformation model.

Figure 5:
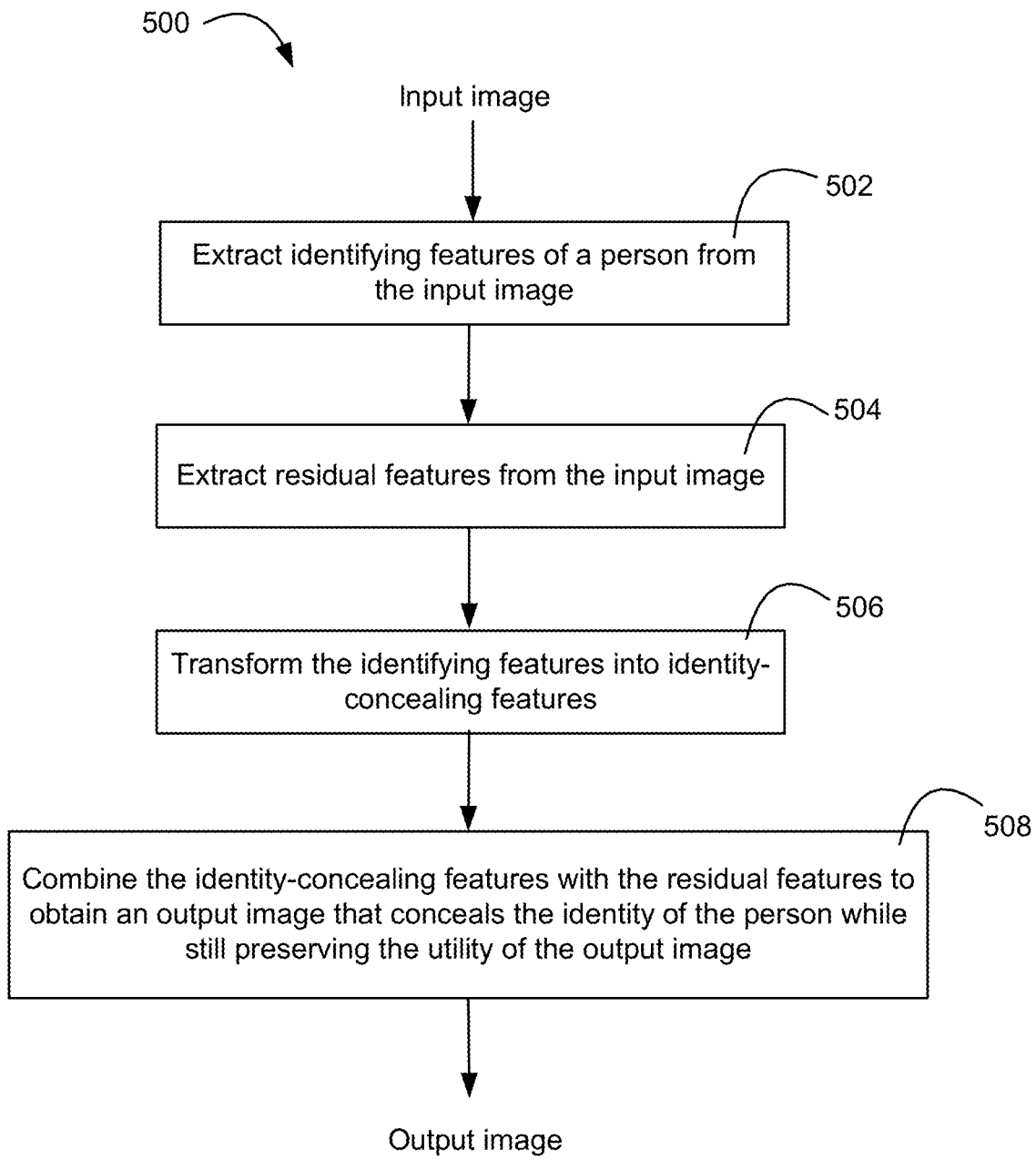
FIG. 5 is a simplified flow diagram illustrating an example process for anonymizing an image of a person in accordance with one or more embodiments of the present disclosure.

FIG. 5 illustrates an example process 500 for processing an input image of a person in accordance with one or more embodiments of the present disclosure. As shown, the process may include extracting a set of identifying features of the person from the input image at 502 and a set of residual features of the input image at 504. The extraction may be performed based on respective first and second ML models, wherein the set of identifying features may indicate, at least partially, an identity of the person, while the set of residual features may include a first subset of features that may be associated with a background of the input image and a second subset of features that may be associated with an utility attribute of the input image such as an eye gaze of the person depicted by the input image. To hide or obscure the identity of the person in an output image and also preserve the utility of the output image, the set of identifying features extracted at 502 may be transformed (e.g., irreversibly) into a set of identity-concealing features at 506 (e.g., based on a third ML model) and the identity-conceal, utility-preserving output image may be generated at 508 based at least on the set of identity-concealing features obtained at 506 and the set of residual features extracted at 504.

For simplicity of explanation, process 500 may be depicted and described herein with a specific order. It should be appreciated, however, that the illustrated operations may be performed in various orders, concurrently, and/or with other operations not presented or described herein. Furthermore, it should be noted that not all operations that may be included in process 500 are depicted and described herein, and not all illustrated operations are required to be performed.

Figure 6:
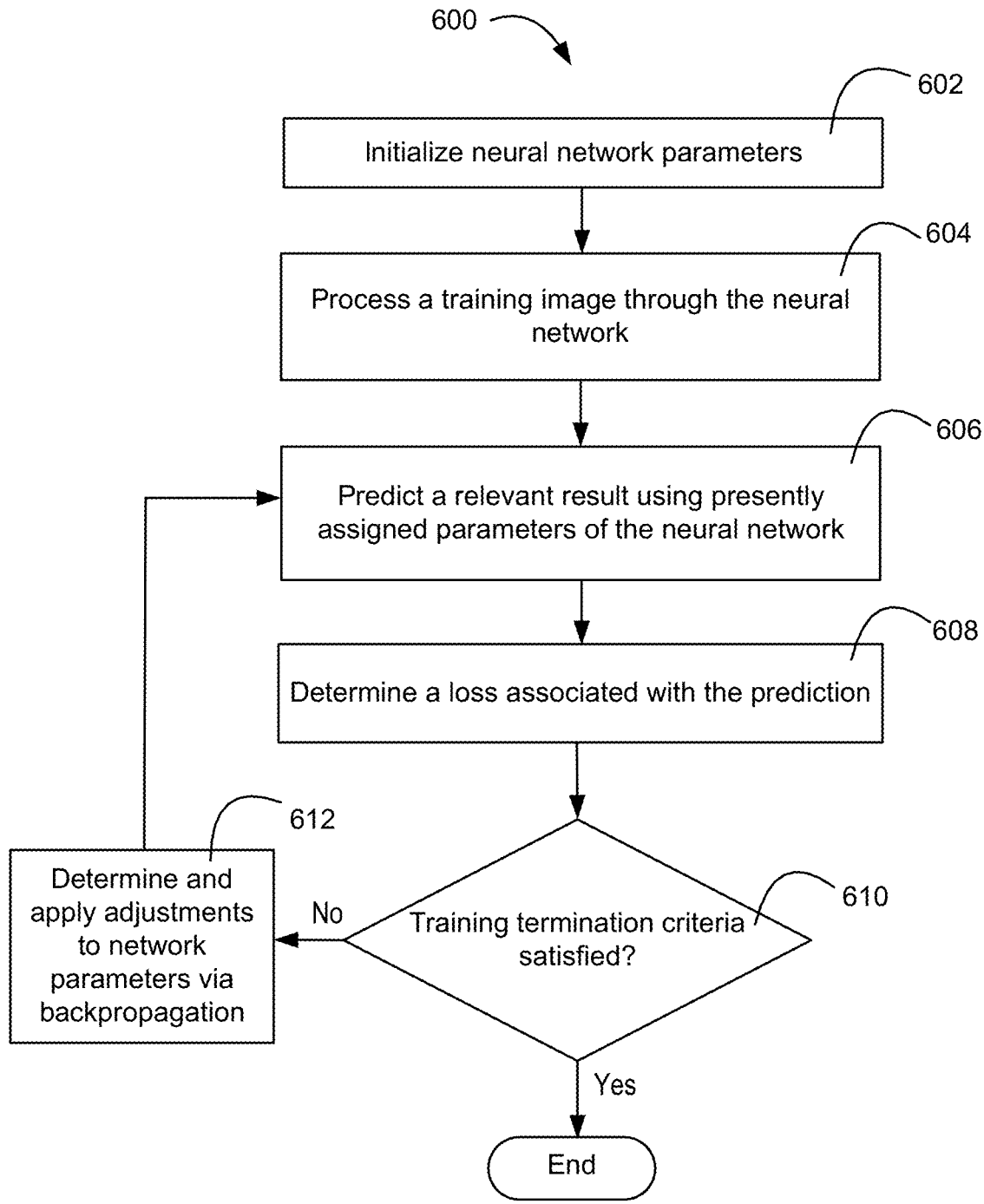
FIG. 6 is a simplified flow diagram illustrating an example process for training an artificial neural network to perform one or more of the image anonymization tasks described herein.

FIG. 6 illustrates an example process 600 for training an artificial neural network to perform the medical image processing tasks described herein. As shown, the training process may include initializing parameters of the neural network (e.g., weights associated with various layers of the neural network) at 602, for example, based on samples from one or more probability distributions or parameter values of another neural network having a similar architecture. The training process 600 may further include processing a training image (e.g., an input image of a person) at 604 using presently assigned parameters of the neural network, and making a prediction about a relevant result (e.g., identifying features of the person, residual features of the input image, utility features of the input image associated with one or more downstream tasks, etc.) at 606. The prediction may then be compared to a ground truth at 608 to determine a loss associated with the prediction. Such a loss may be determined, for example, based on a mean absolute error (MAE), a mean squared error (MSE), or a normalized mean error (NME) between the predicted result and the ground truth, an L1 norm, an L2 norm, etc. At 610, the loss may be evaluated to determine whether one or more training termination criteria are satisfied. For example, the training termination criteria may be determined to be satisfied if the loss is below a threshold value or if the change in the loss between two training iterations falls below a threshold value. If the determination at 610 is that the termination criteria are satisfied, the training may end; otherwise, the presently assigned network parameters may be adjusted at 612, for example, by backpropagating a gradient descent of the loss function through the network before the training returns to 606.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to perform the image processing tasks described herein. As shown, apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 700 may further include a communication circuit 704, a memory 706, a mass storage device 708, an input device 710, and/or a communication link 712 (e.g., a communication bus) over which the one or more components shown in the figure may exchange information.

Communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 706 may include a storage medium (e.g., a non-transitory storage medium) configured to store machine-readable instructions that, when executed, cause processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 702. Input device 710 may include a keyboard, a mouse, a voice-controlled input device, a touch sensitive input device (e.g., a touch screen), and/or the like for receiving user inputs to apparatus 700.

It should be noted that apparatus 700 may operate as a standalone device or may be connected (e.g., networked, or clustered) with other computation devices to perform the functions described herein. And even though only one instance of each component is shown in FIG. 7, a skilled person in the art will understand that apparatus 700 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
a processor configured to:
obtain an input image of a person;
extract, based on an identity concealing machine-learning (ML) model, a set of identifying features from the input image, wherein the set of identifying features indicates, at least partially, an identity of the person;
extract, based on a residual preservation ML model, a set of residual features from the input image, wherein the set of residual features is associated with a background of the input image;
extract, based on a utility preservation ML model, a set of utility features from the input image, wherein the set of utility features is associated with a utility attribute of the input image, and wherein the utility preservation ML model has been pre-trained based on one or more tasks that use the utility attribute of the input image;
transform, based on the identity concealing ML model, the set of identifying features into a set of identity-concealing features, wherein the identity concealing ML model has been pre-trained to perform the transformation in an irreversible manner and based on a first loss designed to disentangle the set of identifying features from the set of residual features and the set of utility features; and
generate an output image of the person based on the set of identity-concealing features, the set of residual features, and the set of utility features, wherein the identity concealing ML model has been pre-trained further based on a second loss designed to maximize a difference between the set of identifying features and the set of identity-concealing features, and wherein the utility preservation ML model has been pre-trained based on a third loss designed to preserve the set of utility features in the output image.

2. The apparatus of claim 1, wherein the set of identity-concealing features includes randomly added noise.

3. The apparatus of claim 1, wherein the identity concealing ML model is implemented through an artificial neural network comprising an encoder and a decoder, wherein the encoder is trained for predicting a latent space representation of the set of identifying features, and wherein the decoder is trained for generating the set of identity-concealing features based on the latent space representation and by distancing the set of identity-concealing features from the set of identifying features.

4. The apparatus of claim 1, wherein the identity concealing ML model and the utility preservation ML model are trained together through a training process that comprises:
generating a preliminary output image based on an input training image;
extracting, based on present parameters of the utility preservation ML model, a first plurality of utility features from the preliminary output image, wherein the first plurality of utility features is associated with the utility attribute used by the one or more tasks;

extracting, based on the present parameters of the utility preservation ML model, a second plurality of utility features from the input training image, wherein the second plurality of utility features is associated with the utility attribute used by the one or more tasks; and adjusting the present parameters of the utility preservation ML model to reduce a difference between the first plurality of utility features and the second plurality of utility features.

5. The apparatus of claim 4, wherein the training process further comprises:

extracting, based on present parameters of the identity concealing ML model, identifying features from the input training image;

generating corresponding identity-concealing features based on the identifying features extracted from the input training image; and adjusting the present parameters of the identity concealing ML model to maximize a difference between the identifying features extracted from the input training image and the identity-concealing features generated by the identity concealing ML model.

6. The apparatus of claim 5, wherein the utility preservation ML model and the identity concealing ML model are trained together with the residual preservation ML model, wherein the residual preservation ML model is used during the training process to extract respective residual features from the input training image and the preliminary output image, and wherein the respective present parameters of the utility preservation ML model and the identity concealing ML model are adjusted during the training process to minimize a difference between the respective residual features extracted from the input training image and the preliminary output image.

7. The apparatus of claim 1, wherein at least one of the utility preservation ML model or the identity concealing ML model is derived through ensemble learning.

8. The apparatus of claim 1, wherein the processor being configured to generate the output image of the person based on the set of identity-concealing features, the set of residual features, and the set of utility features comprises the processor being configured to combine the set of identity-concealing features, the set of residual features, and the set of utility features, and generate the output image based on the combined features.

9. The apparatus of claim 1, wherein the utility attribute of the input image for the one or more tasks is associated with at least one of a gaze of the person as depicted in the input image, a facial expression of the person as depicted in the input image, or a facial landmark of the person as depicted in the input image.

10. A method of anonymizing images, the method comprising:

obtaining an input image of a person;

extracting, based on an identity concealing machine-learning (ML) model, a set of identifying features from the input image, wherein the set of identifying features indicates, at least partially, an identity of the person;

extracting, based on a residual preservation ML model, a set of residual features from the input image, wherein the set of residual features is associated with a background of the input image;

extracting, based on a utility preservation ML model, a set of utility features from the input image, wherein the set of utility features is associated with a utility attribute of the input image, and wherein the utility preservation ML model has been pre-trained based on one or more tasks that use the utility attribute of the input image;

transforming, based on the identity concealing ML model, the set of identifying features into a set of identity-concealing features, wherein the identity concealing ML model has been pre-trained to perform the transformation in an irreversible manner and based on a first loss designed to disentangle the set of identifying features from the set of residual features and the set of utility features; and generating an output image of the person based on the set of identity-concealing features, the set of residual features, and the set of utility features, wherein the identity concealing ML model has been pre-trained further based on a second loss designed to maximize a difference between the set of identifying features and the set of identity-concealing features, and wherein the utility preservation ML model has been pre-trained based on a third loss designed to preserve the set of utility features in the output image.

11. The method of claim 10, wherein the set of identity-concealing features includes randomly added noise.

12. The method of claim 10, wherein the identity concealing ML model is implemented through an artificial neural network comprising an encoder and a decoder, wherein the encoder is trained for predicting a latent space representation of the set of identifying features, and wherein the decoder is trained for generating the set of identity-concealing features based on the latent space representation and by distancing the set of identity-concealing features from the set of identifying features.

13. The method of claim 10, wherein the identity concealing ML model and the utility preservation are trained together through a training process that comprises:

generating a preliminary output image based on an input training image;

extracting, based on present parameters of the utility preservation ML model, a first plurality of utility features from the preliminary output image, wherein the first plurality of utility features is associated with the utility attribute used by the one or more tasks;

extracting, based on the present parameters of the utility preservation ML model, a second plurality of utility features from the input training image, wherein the second plurality of utility features is associated with the utility attribute used by the one or more tasks; and adjusting the present parameters of the utility preservation ML model to reduce a difference between the first plurality of utility features and the second plurality of utility features.

14. The method of claim 13, wherein the training process further comprises:

extracting, based on present parameters of the identity concealing ML model, identifying features from the input training image;

generating corresponding identity-concealing features based on the identifying features extracted from the input training image; and adjusting the present parameters of the identity concealing ML model to maximize a difference between the identifying features extracted from the input training image and the identity-concealing features generated by the identity concealing ML model.

15. The method of claim 14, wherein the utility preservation ML model and the identity concealing are trained together with the residual preservation ML model, wherein the residual preservation ML model is used during the training process to extract respective residual features from the input training image and the preliminary output image, and wherein the respective present parameters of the utility preservation ML model and the identity concealing ML model are adjusted during the training process to minimize a difference between the respective residual features extracted from the input training image and the preliminary output image.

16. The method of claim 10, wherein the utility attribute of the input image for the one or more tasks is associated with at least one of a gaze of the person as depicted in the input image, a facial expression of the person as depicted in the input image, or a facial landmark of the person as depicted in the input image.

17. A non-transitory computer-readable medium comprising instructions that, when executed by a processor included in a computing device, cause the processor to implement the method of claim 10.

* * * * *